United States Patent
Fan

(10) Patent No.: US 12,492,756 B2
(45) Date of Patent: Dec. 9, 2025

(54) SERIES-CONNECTION TYPE SERVO VALVE MECHANISM

(71) Applicant: SHENZHEN KATOP AUTOMATION TECHNOLOGY CO., LTD., Guangdong (CN)

(72) Inventor: Zhenhua Fan, Guangdong (CN)

(73) Assignee: SHENZHEN KATOP AUTOMATION TECHNOLOGY CO., LTD., Guangdong (CN)

( * ) Notice: Subject to any disclaimer, the term of this patent is extended or adjusted under 35 U.S.C. 154(b) by 241 days.

(21) Appl. No.: 18/263,525

(22) PCT Filed: Dec. 1, 2021

(86) PCT No.: PCT/CN2021/134800
§ 371 (c)(1),
(2) Date: Jul. 29, 2023

(87) PCT Pub. No.: WO2022/160924
PCT Pub. Date: Aug. 4, 2022

(65) Prior Publication Data
US 2024/0117887 A1  Apr. 11, 2024

(30) Foreign Application Priority Data
Jan. 29, 2021 (CN) .......................... 202110126731.0

(51) Int. Cl.
*F16K 11/16* (2006.01)
*F16K 31/04* (2006.01)

(52) U.S. Cl.
CPC .......... *F16K 11/166* (2013.01); *F16K 31/047* (2013.01); *Y10T 137/87756* (2015.04)

(58) Field of Classification Search
CPC ...... F16K 11/16; F16K 11/163; F16K 11/166; F16K 31/047; Y10T 137/87748; Y10T 137/87756; Y10T 137/86879
(Continued)

(56) References Cited

U.S. PATENT DOCUMENTS 1,766,703 A * 6/1930 Bridgham ............... F16K 11/16
                                                                137/627
2,730,130 A * 1/1956 Guidry .................. E21B 34/066
                                                                251/74

(Continued)

FOREIGN PATENT DOCUMENTS

CN           102242742 A      11/2011
CN           204611063 U       9/2015
(Continued)

OTHER PUBLICATIONS

First Office Action issued in Chinese Patent Application No. 2021101267310 dated Nov. 20, 2024 (15 pages).
(Continued)

*Primary Examiner* — Kenneth Rinehart
*Assistant Examiner* — Jonathan J Waddy
(74) *Attorney, Agent, or Firm* — Hunton Andrews Kurth LLP

(57) ABSTRACT

Provided is a series-connection type servo valve mechanism. The mechanism includes: a drive motor, a first valve seat, and a second valve seat, a first guide block, a first eccentric wheel, a second guide block, a second eccentric wheel, a first eccentric shaft, a second eccentric shaft, a first valve core seat, a second valve core seat, a first valve core, a second valve core, a first valve rod, a second valve rod, a first valve core plug, and a second valve core plug. The first guide block is capable of driving the first valve core plug through the first valve rod to move and cooperating with the (Continued)

first valve core to open or close an internal channel of the first valve core seat.

10 Claims, 4 Drawing Sheets

(58) Field of Classification Search
USPC .................................. 137/625.48, 867, 868
See application file for complete search history.

(56) References Cited

U.S. PATENT DOCUMENTS

| | | | | |
|---|---|---|---|---|
| 3,118,390 | A | * | 1/1964 | Kinsley ................. F16K 11/166 137/625.48 |
| 2015/0041007 | A1 | * | 2/2015 | Kawasaki ........... F16K 11/0716 137/625.11 |

FOREIGN PATENT DOCUMENTS

| | | |
|---|---|---|
| CN | 108105425 A | 6/2018 |
| CN | 207701837 U | 8/2018 |
| CN | 108745798 A | 11/2018 |
| CN | 110773388 A | 2/2020 |
| CN | 111255918 A | 6/2020 |
| CN | 210715966 U | 6/2020 |
| CN | 210950110 U | 7/2020 |
| CN | 112943972 A | 6/2021 |
| CN | 214999555 U | 12/2021 |
| DE | 102015016785 A1 | 4/2017 |
| JP | 2001123497 A | 5/2001 |
| JP | 2011094677 A | 5/2011 |
| JP | 2014149083 A | 8/2014 |
| JP | 2019107633 A | 7/2019 |

OTHER PUBLICATIONS

First Office Action issued in Japanese Patent Application No. 2023-546055 dated Mar. 19, 2024 (8 pages).
International Search Report issued in PCT/CN2021/134800 dated Jan. 27, 2022, 4 pages.

* cited by examiner

SERIES-CONNECTION TYPE SERVO VALVE MECHANISM

CROSS-REFERENCE TO RELATED APPLICATION

This is a National stage application, filed under 37 U.S.C. 371, of International Patent Application NO. PCT/CN2021/134800, filed on Dec. 1, 2021, which is based on and claims priority to Chinese Patent Application No. 202110126731.0 filed with the China National Intellectual Property Administration (CNIPA) on Jan. 29, 2021, the disclosure of which is incorporated herein by reference in its entirety.

TECHNICAL FIELD

The present disclosure relates to the field of lithium battery production, and in particular, a series-connection type servo valve mechanism.

BACKGROUND

In the field of lithium battery production, it is a very important process to coat a substrate. The efficiency and quality of coating directly affect the production efficiency and production quality of a lithium battery. The coating plays a vital role in the whole lithium battery production.

During the substrate coating process of the lithium battery, due to the continuous increase of coating speed, the operation frequency of a servo valve is increased, and the response time of the servo valve becomes shorter and shorter. In the existing art, the coating process generally uses a parallel servo valve mechanism to control a coating slurry to achieve intermittent coating. When the coating speed is increased to 30 m/min or more, the signal response between two servo valves in parallel approaches 8 ms in the existing art. If a slight signal delay occurs, the thicknesses of the head and tail of the coating will be out of tolerance, affecting the coating quality. The object of the present disclosure is to provide a new solution to overcome the existing technical defects.

SUMMARY

To overcome the defects in the existing art, the present disclosure provides a series-connection type servo valve mechanism to solve the technical problems of signal delay, head-to-tail thickness out of tolerance of the coating, poor coating quality and the like occurring in the intermittent coating in the existing art.

To solve the technical problems, the present disclosure adopts the solutions described below.

The series-connection type servo valve mechanism includes a drive motor, a first valve seat, and a second valve seat. A first guide block and a first eccentric wheel are mounted in the first valve seat. A second guide block and a second eccentric wheel are mounted in the second valve seat. The first eccentric wheel is provided with a first eccentric shaft movably connected to the first guide block and capable of driving the first guide block to reciprocate within the first valve seat. The second eccentric wheel is provided with a second eccentric shaft movably connected to the second guide block and capable of driving the second guide block to reciprocate within the second valve seat. An output end of the drive motor is connected to the first eccentric wheel and capable of driving the first eccentric wheel to rotate. The first eccentric shaft is connected to the second eccentric wheel and capable of driving the second eccentric wheel to rotate. The first valve seat and the second valve seat are connected to a first valve core seat and a second valve core seat respectively. A first valve core is mounted in the first valve core seat. A second valve core is mounted in the second valve core seat. The first guide block is fixedly connected to a first valve rod. The second guide block is fixedly connected to a second valve rod. The first valve rod extends in the first valve core seat, and a first valve core plug matching the first valve core seat is mounted on the first valve rod. The second valve rod extends in the second valve core seat, and a second valve core plug matching the second valve core is mounted on the second valve rod. The first guide block is capable of driving the first valve core plug through the first valve rod to move and cooperating with the first valve core to open or close an internal channel of the first valve core seat. The second guide block is capable of driving the second valve core plug through the second valve rod to move and cooperating with the second valve core to open or close an internal channel of the second valve core seat.

As an improved technical solution of the present disclosure, the first valve core seat is provided with a first joint. The second valve core seat is provided with a second joint. The first joint is provided with a first outlet. The second joint is provided with a second outlet. The first valve core seat is provided with a first inlet. The second valve core seat is provided with a second inlet. The second inlet communicates with the first inlet.

As an improved technical solution of the present disclosure, the first valve core seat is provided with a connection pipe. The connection pipe communicates with the first inlet. The connection pipe communicates with the second inlet and is fixedly connected to the second inlet by a second clamp. A seal ring is disposed between the connection pipe and the second inlet.

As an improved technical solution of the present disclosure, the first joint is fixedly connected to the first valve core seat through a third clamp. The second joint is fixedly connected to the second valve core seat through a fourth clamp. A seal ring is disposed between the first joint and the first valve core seat. A seal ring is disposed between the second joint and the second valve core seat. The first valve rod extends in the first joint. The first valve core plug is located in an inner cavity of the first joint. The second valve rod extends in the second joint. The second valve core plug is located in an inner cavity of the second joint.

As an improved technical solution of the present disclosure, the output end of the drive motor is provided with a first coupling and is connected to the first eccentric wheel through the first coupling. The drive motor is fixedly mounted on a side portion of the first valve seat and fixedly connected to the first valve seat through a first coupling clamp.

As an improved technical solution of the present disclosure, an output end of the first eccentric shaft is provided with an adapter shaft. A second coupling is disposed between the adapter shaft and the second eccentric wheel. The first eccentric shaft is capable of driving the second eccentric wheel through the adapter shaft and the second coupling to rotate. A first dial and a second dial are provided on the outside of the second coupling. A pointer of the first dial rotates synchronously with the first eccentric shaft. A pointer of the second dial rotates synchronously with the second eccentric wheel.

As an improved technical solution of the present disclosure, a first guide sleeve is provided inside the first valve seat. The first valve rod is mounted in the first guide sleeve. A second guide sleeve is provided inside the second valve seat. The second valve rod is mounted in the second guide sleeve.

As an improved technical solution of the present disclosure, the first eccentric wheel includes a first eccentric wheel shaft portion and a first eccentric wheel disk. The first eccentric wheel shaft portion is rotatably mounted inside the first valve seat. The first eccentric shaft is fixedly mounted on the first eccentric wheel disk. The second eccentric wheel includes a second eccentric wheel shaft portion and a second eccentric wheel disk. The second eccentric wheel shaft portion is rotatably mounted inside the second valve seat. The second eccentric shaft is fixedly mounted on the second eccentric wheel disk.

As an improved technical solution of the present disclosure, the first valve rod is fixedly connected to an upper part of the first guide block through a first screw. The second valve rod is fixedly connected to an upper part of the second guide block through a second screw. A first guide rod is fixedly connected to a lower part of the first guide block through a third screw. The first guide rod extends outwardly from the bottom of the first valve seat to the outside of the first valve seat. The first valve seat is provided with a through hole matching the first guide rod. A second guide rod is fixedly connected to a lower part of the second guide block through a fourth screw. The second guide rod extends outwardly from the bottom of the second valve seat to the outside of the second valve seat. The second valve seat is provided with a through hole matching the second guide rod.

As an improved technical solution of the present disclosure, the first valve seat is fixedly connected to the first valve core seat through a fifth clamp. The second valve seat is fixedly connected to the second valve core seat through a sixth clamp. A sealing ring is disposed between the first valve seat and the first valve core seat. A sealing ring is disposed between the second valve seat and the second valve core seat. The first valve seat is fixedly connected to the second valve seat through a seventh clamp. A first valve seat chamber is provided inside the first valve seat, and the first guide block is mounted in the first valve seat chamber. A second valve seat chamber is provided inside the second valve seat, and the second guide block is mounted in the second valve seat chamber.

The present disclosure has the following beneficial effects: the present disclosure provides a series-connection type servo valve mechanism that drives the first valve core plug and the second valve plug to move through the same drive motor, effectively eliminating the signal delay occurring in the existing parallel servo valve, alleviating the phenomenon of head-to-tail out of tolerance of the coating caused by the servo signal delay, improving the coating quality, also facilitating achieving a high-speed coating, and improving the coating efficiency. Moreover, the operation of the servo valve can be adjusted according to actual requirements. The servo valve has the characteristics of high application flexibility and universality.

In summary, the series-connection type servo valve mechanism solves the technical defects such as signal delay, head-to-tail thickness out of tolerance of the coating, poor coating quality, and the like occur during the intermittent coating in the existing art.

BRIEF DESCRIPTION OF DRAWINGS

The present disclosure is described hereinafter in detail in conjunction with drawings and embodiments.

DETAILED DESCRIPTION

Figure 1:
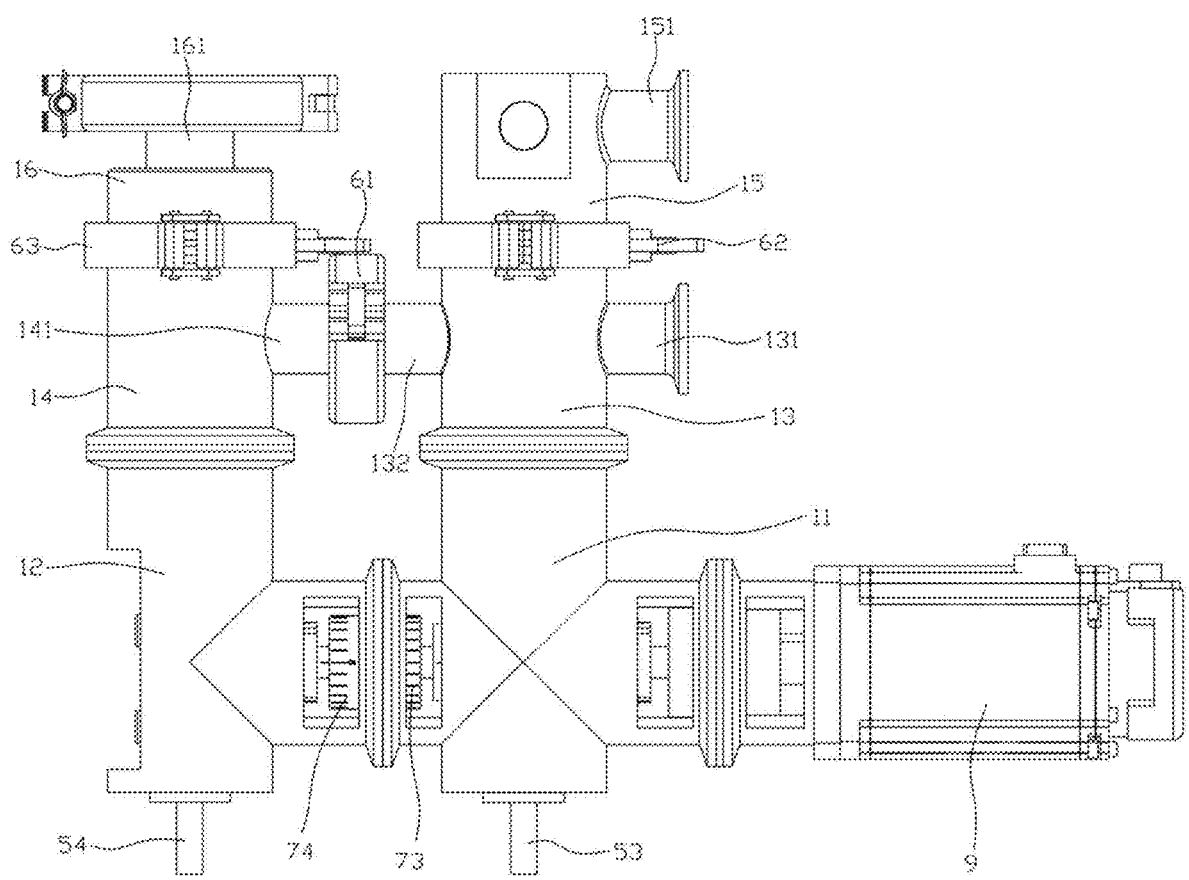
FIG. 1 is an assembly view of the present disclosure.
Figure 2:
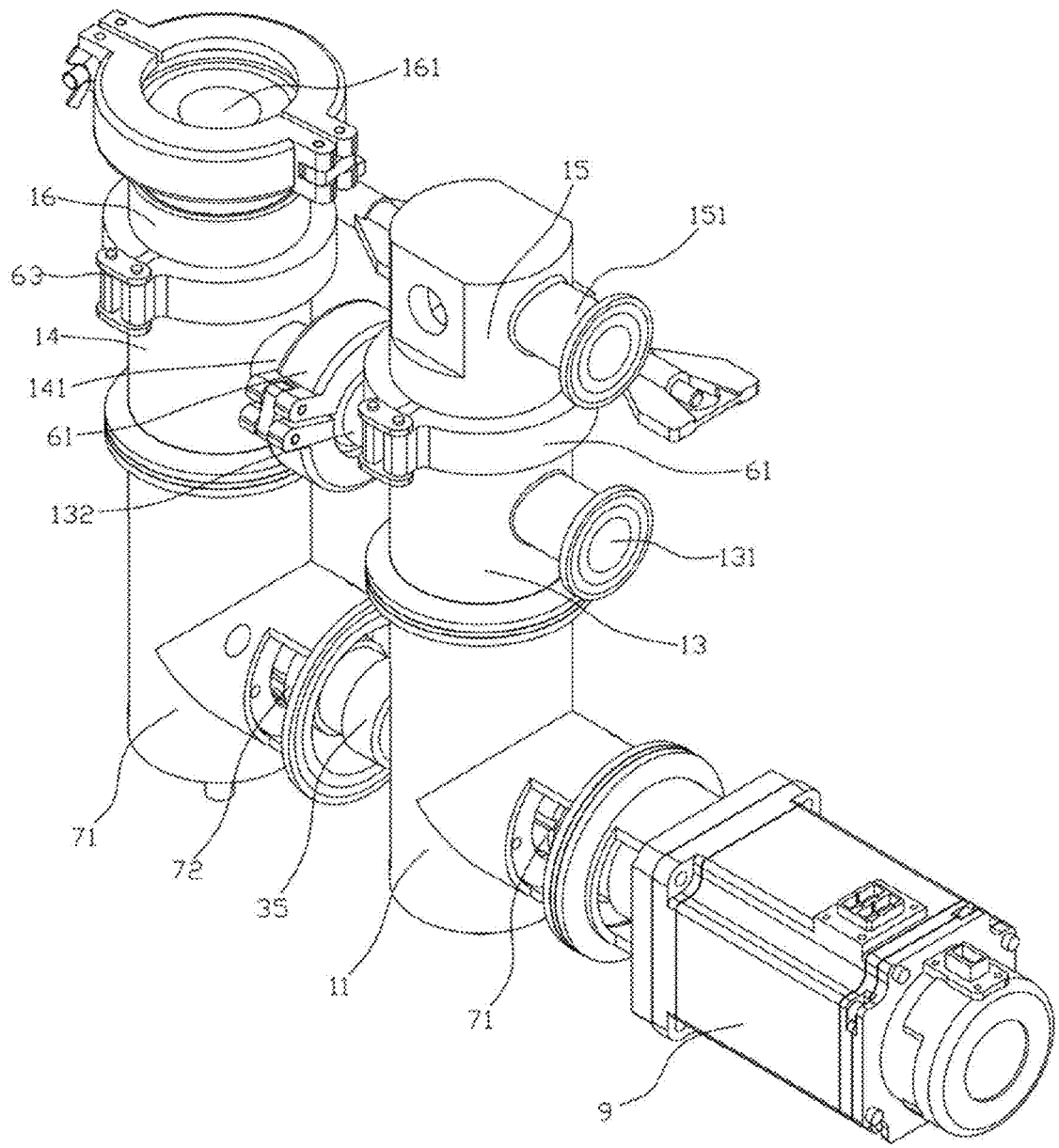
FIG. 2 is an assembly view from another angle of the present disclosure.
Figure 3:
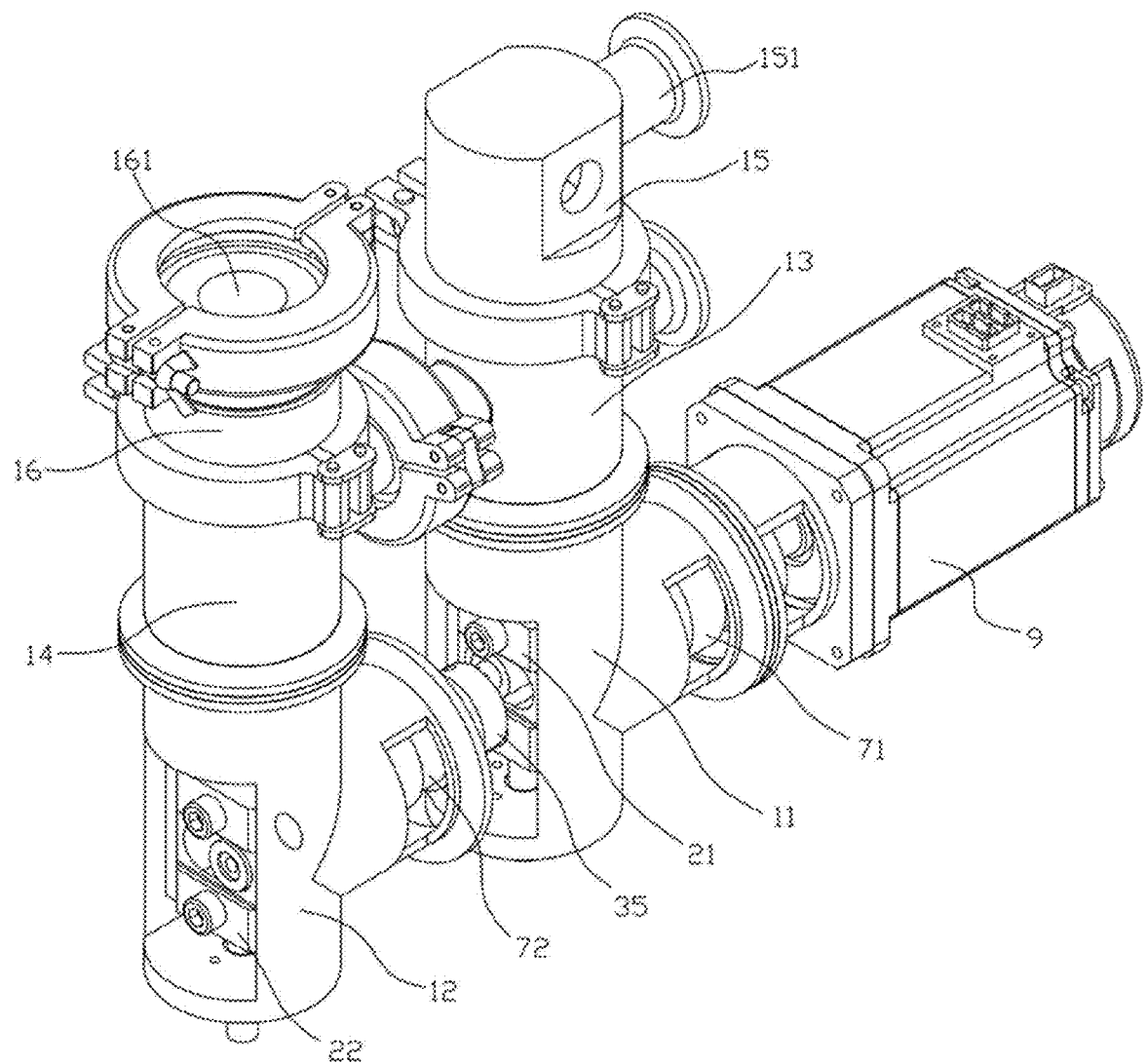
FIG. 3 is an assembly view from a third angle of the present disclosure.
Figure 4:
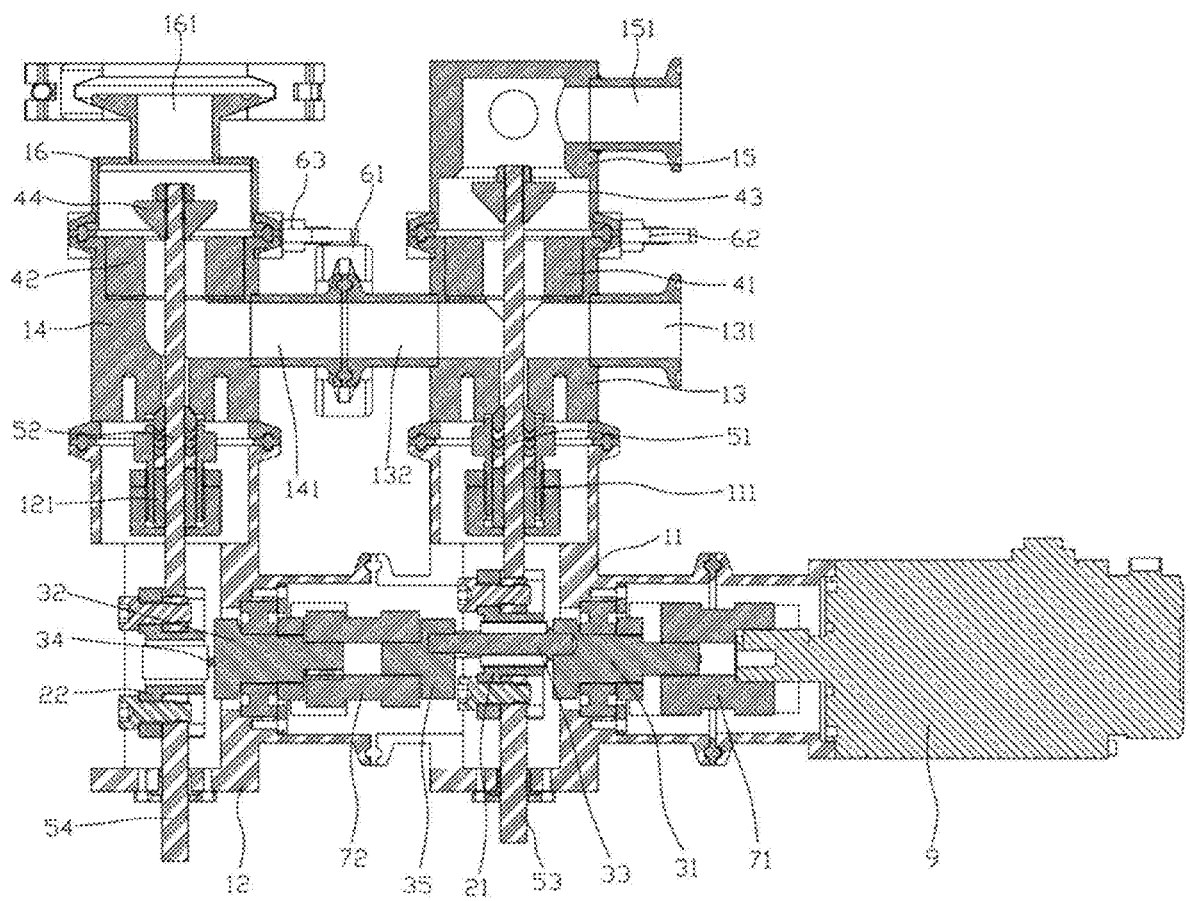
FIG. 4 is a sectional view of the present disclosure.
Figure 5:
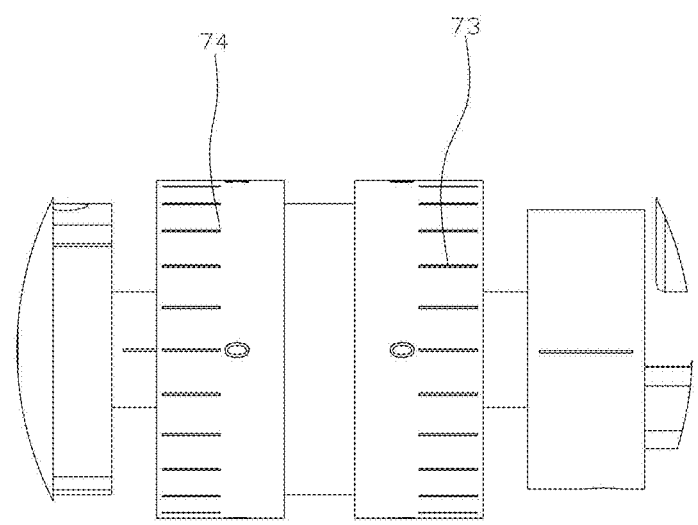
FIG. 5 is a view showing an angle adjustment of a servo valve in the present disclosure.

A concept, a specific structure and technical effects of the present invention are clearly and completely described below in conjunction with the embodiments and drawings, so as to fully understand the object, feature and effects of the present invention. Apparently, the embodiments described herein are part, not all, of the embodiments of the present invention. In addition, all coupling/connection relationships involved in the patent do not mean that components are directly connected, but mean that according to a specific implementation, coupling accessories are added or reduced so as to compose a better coupling structure. Referring to FIGS. 1 to 5, various technical features in the present invention can be combined interactively on the premise of not contradicting each other.

A series-connection type servo valve mechanism includes a drive motor 9, a first valve seat 11, and a second valve seat 12. A first guide block 21 and a first eccentric wheel 31 are mounted in the first valve seat 11. A second guide block 22 and a second eccentric wheel 32 are mounted in the second valve seat 12. The first eccentric wheel 31 is provided with a first eccentric shaft 33 movably connected to the first guide block 21 and capable of driving the first guide block 21 to reciprocate within the first valve seat 11. The second eccentric wheel 32 is provided with a second eccentric shaft 34 movably connected to the second guide block 22 and capable of driving the second guide block 22 to reciprocate within the second valve seat 12. An output end of the drive motor 9 is connected to the first eccentric wheel 31 and capable of driving the first eccentric wheel 31 to rotate. The first eccentric shaft 33 is connected to the second eccentric wheel 32 and capable of driving the second eccentric wheel 32 to rotate. The first valve seat 11 and the second valve seat 12 are connected to a first valve core seat 13 and a second valve core seat 14, respectively. A first valve core 41 is mounted in the first valve core seat 13, and a second valve core 42 is mounted in the second valve core seat 14. The first guide block 21 is fixedly connected to a first valve rod 51, and the second guide block 22 is fixedly connected to a second valve rod 52. The first valve rod 51 extends in the first valve core seat 13 and is mounted with a first valve core plug 43 matching the first valve core seat 41. The second valve rod 52 extends in the second valve core seat 14 and is mounted with a second valve core plug 44 matching the second valve core 42. The first guide block 21 can drive the first valve core plug 43 by the first valve rod 51 to move and cooperate with the first valve core 41 to open or close an internal channel of the first valve core seat 13. The second guide block 22 can drive the second valve core plug 44 by the second valve rod 52 to move and cooperate with the second valve core 42 to open or close an internal channel of the second valve core seat 14.

Preferably, the first valve core seat 13 is provided with a first joint 15, and the second valve core seat 14 is provided with a second joint 16. The first joint 15 is provided with a first outlet 151, and the second joint 16 is provided with a second outlet 161. The first valve core seat 13 is provided with a first inlet 131, and the second valve core seat 14 is provided with a second inlet 141. The second inlet 141 communicates with the first inlet 131.

Preferably, the first valve core seat 13 is provided with a connection pipe 132. The connection pipe 132 communicates with the first inlet 131. The connection pipe 132 communicates with the second inlet 141, and is fixedly connected to the second inlet 141 using a second clamp 61. A seal ring is disposed between the connection pipe 132 and the second inlet 141.

Preferably, the first joint 15 is fixedly connected to the first valve core seat 13 through a third clamp 62, and the second joint 16 is fixedly connected to the second valve core seat 14 through a fourth clamp 63. A seal ring is disposed between the first joint 15 and the first valve core seat 13, and A seal ring is disposed between the second joint 16 and the second valve core seat 14. The first valve rod 51 extends in the first joint 15, and the first valve core plug 43 is located in an inner cavity of the first joint 15. The second valve rod 52 extends in the second joint 16, and the second valve core plug 44 is located in an inner cavity of the second joint 16.

Preferably, the output end of the drive motor 9 is provided with a first coupling 71 through which the drive motor 9 is connected to the first eccentric wheel 31. The drive motor 9 is fixedly mounted on a side portion of the first valve seat 11 and fixedly connected to the first valve seat 11 through a first coupling clamp.

Preferably, an output end of the first eccentric shaft 33 is provided with an adapter shaft 35. A second coupling 72 is disposed between the adapter shaft 35 and the second eccentric wheel 32.

The first eccentric shaft 33 is capable of driving the second eccentric wheel 32 through the adapter shaft 35 and the second coupling 72 to rotate. A first dial 73 and a second dial 74 are provided on the outside of the second coupling 72. A pointer of the first dial 73 rotates synchronously with the first eccentric shaft 33, and a pointer of the second dial 74 rotates synchronously with the second eccentric wheel.

Preferably, a first guide sleeve 111 is provided inside the first valve seat 11, and the first valve rod 51 is mounted in the first guide sleeve 111. A second guide sleeve 121 is provided inside the second valve seat 12, and the second valve rod 52 is mounted in the second guide sleeve 121.

Preferably, the first eccentric wheel 31 includes a first eccentric wheel shaft portion and a first eccentric wheel disk, the first eccentric wheel shaft portion is rotatably mounted inside the first valve seat 11, and the first eccentric shaft 33 is fixedly mounted on the first eccentric wheel disk. The second eccentric wheel 32 includes a second eccentric wheel shaft portion and a second eccentric wheel disk, the second eccentric wheel shaft portion is rotatably mounted inside the second valve seat 12, and the second eccentric shaft 34 is fixedly mounted on the second eccentric wheel disk.

Preferably, the first valve rod 51 is fixedly connected to an upper part of the first guide block 21 through a first screw, and the second valve rod 52 is fixedly connected to an upper part of the second guide block 22 through a second screw. A first guide rod 53 is fixedly connected to a lower part of the first guide block 21 through a third screw, and extends outwardly from the bottom of the first valve seat 11 to the outside of the first valve seat 11. The first valve seat 11 is provided with a through hole matching the first guide rod 53. A second guide rod 54 is fixedly connected to a lower part of the second guide block 22 through a fourth screw, and extends outwardly from the bottom of the second valve seat 12 to the outside of the second valve seat 12. The second valve seat 12 is provided with a through hole matching the second guide rod 54.

Preferably, the first valve seat 11 is fixedly connected to the first valve core seat 13 through a fifth clamp, and the second valve seat 12 is fixedly connected to the second valve core seat 14 through a sixth clamp. A sealing ring is disposed between the first valve seat 11 and the first valve core seat 13, and a sealing ring is disposed between the second valve seat 12 and the second valve core seat 14. The first valve seat 11 is fixedly connected to the second valve seat 12 through a seventh clamp. A first valve seat chamber is provided inside the first valve seat 11, and the first guide block 21 is mounted in the first valve seat chamber. A second valve seat chamber is provided inside the second valve seat 12, and the second guide block 22 is mounted in the second valve seat chamber.

When the present disclosure is implemented, the drive motor 9 drives the first eccentric wheel 31 to rotate, the first eccentric wheel 31 drives the first eccentric shaft 33 to move, the first eccentric shaft 33 drives the second eccentric wheel 32 through the adapter shaft 35 to rotate, and the second eccentric wheel 32 drives the second eccentric shaft 34 to move.

During the movement of the first eccentric shaft 33, the first eccentric shaft 33 is capable of driving the first guide block 21 to move up and down, the first guide block 21 drives the first valve rod 51 to move up and down, and the first valve rod 51 drives the first valve core plug 43 to move up and down. In this manner, the first valve core plug 43 cooperates with the first valve element 41 to open or close the internal channel of the first valve core seat 13. Similarly, during the movement of the second eccentric shaft 34, the second eccentric shaft 34 is capable of driving the second guide block 22 to move up and down, the second guide block 22 drives the second valve rod 52 to move up and down, and the second valve rod 52 drives the second valve core plug 44 to move up and down. In this manner, the second valve core plug 44 cooperates with the second valve core 42 to open or close the internal channel of the second valve core seat 14.

Two servo valves can be moved by one drive motor 9, and if necessary, three or more servo valves can be connected in series and driven by the same motor, eliminating the signal delay.

In this solution, the adapter shaft 35 and the second coupling 72 are used to implement the series-connection operation of two valve mechanisms, allowing the consistence in start/stop time so that no signal delay occurs, thereby facilitating improving the response speed, the coating efficiency, and the coating quality. The first dial 73 and the second dial 74 on the second coupling 72 can facilitate observing the angular difference between the two valve mechanisms. In practice, the relative rotation angle between the two servo valve mechanisms can be adjusted as required and then locked and connected.

The relative rotation angle of the eccentric wheel mechanisms inside the two valve mechanisms is adjusted so that the position difference of the two valve core plugs can be controlled. When the drive motor 9 works, the operations of the valve core plugs of the two servo valves are different and can be flexibly adjusted according to the process requirements.

The above is a specific description of preferred embodiments of the present disclosure. However, the present disclosure is not limited to the embodiments. Various equivalent modifications or alterations may further be made by those skilled in the art without departing from the spirit of the present disclosure.

What is claimed is:

1. A series-connection type servo valve mechanism, comprising:
a drive motor, a first valve seat, and a second valve seat, wherein a first guide block and a first eccentric wheel are mounted in the first valve seat, a second guide block and a second eccentric wheel are mounted in the second valve seat, the first eccentric wheel is provided with a first eccentric shaft, the first eccentric shaft is movably connected to the first guide block and capable of driving the first guide block to reciprocate within the first valve seat; the second eccentric wheel is provided with a second eccentric shaft, the second eccentric shaft is movably connected to the second guide block and capable of driving the second guide block to reciprocate within the second valve seat, an output end of the drive motor is connected to the first eccentric wheel and capable of driving the first eccentric wheel to rotate, the first eccentric shaft is connected to the second eccentric wheel and capable of driving the second eccentric wheel to rotate, the first valve seat and the second valve seat are connected to a first valve core seat and a second valve core seat respectively, a first valve core is mounted in the first valve core seat, a second valve core is mounted in the second valve core seat, the first guide block is fixedly connected to a first valve rod, the second guide block is fixedly connected to a second valve rod, the first valve rod extends in the first valve core seat, a first valve core plug matching the first valve core seat is mounted on the first valve rod, the second valve rod extends in the second valve core seat, a second valve core plug matching the second valve core is mounted on the second valve rod, the first guide block is capable of driving the first valve core plug through the first valve rod to move and cooperating with the first valve core to open or close an internal channel of the first valve core seat, the second guide block is capable of driving the second valve core plug through the second valve rod to move and cooperating with the second valve core to open or close an internal channel of the second valve core seat.

2. The series-connection type servo valve mechanism of claim 1, wherein the first valve core seat is provided with a first joint, the second valve core seat is provided with a second joint, the first joint is provided with a first outlet, the second joint is provided with a second outlet, the first valve core seat is provided with a first inlet, the second valve core seat is provided with a second inlet, and the second inlet communicates with the first inlet.

3. The series-connection type servo valve mechanism of claim 2, wherein the first valve core seat is provided with a connection pipe, the connection pipe communicates with the first inlet, the connection pipe communicates with the second inlet and is fixedly connected to the second inlet by a second clamp, and a seal ring is disposed between the connection pipe and the second inlet.

4. The series-connection type servo valve mechanism of claim 2, wherein the first joint is fixedly connected to the first valve core seat through a third clamp, the second joint is fixedly connected to the second valve core seat through a fourth clamp, a seal ring is disposed between the first joint and the first valve core seat, a seal ring is disposed between the second joint, and the second valve core seat, the first valve rod extends in the first joint, the first valve core plug is located in an inner cavity of the first joint-, the second valve rod extends in the second joint, and the second valve core plug is located in an inner cavity of the second joint.

5. The series-connection type servo valve mechanism of claim 1, wherein the output end of the drive motor is provided with a first coupling and connected to the first eccentric wheel through the first coupling; and the drive motor is fixedly mounted on a side portion of the first valve seat and fixedly connected to the first valve seat through a first coupling clamp.

6. The series-connection type servo valve mechanism of claim 1, wherein an output end of the first eccentric shaft is provided with an adapter shaft, a second coupling is disposed between the adapter shaft and the second eccentric wheel, the first eccentric shaft is capable of driving the second eccentric wheel through the adapter shaft and the second coupling to rotate, a first dial and a second dial are provided on an outside of the second coupling, a pointer of the first dial rotates synchronously with the first eccentric shaft, and a pointer of the second dial rotates synchronously with the second eccentric wheel.

7. The series-connection type servo valve mechanism of claim 1, wherein a first guide sleeve is provided inside the first valve seat, the first valve rod is mounted in the first guide sleeve, a second guide sleeve is provided inside the second valve seat, and the second valve rod, is mounted in the second guide sleeve.

8. The series-connection type servo valve mechanism of claim 1, wherein the first eccentric wheel 34 comprises a first eccentric wheel shaft portion and a first eccentric wheel disk, the first eccentric wheel shaft portion is rotatably mounted inside the first valve seat, the first eccentric shaft is fixedly mounted on the first eccentric wheel disk, the second eccentric wheel comprises a second eccentric wheel shaft portion and a second eccentric wheel disk, the second eccentric wheel shaft portion is rotatably mounted inside the second valve seat, and the second eccentric shaft is fixedly mounted on the second eccentric wheel disk.

9. The series-connection type servo valve mechanism of claim 1, wherein the first valve rod is fixedly connected to an upper part of the first guide block through a first screw, the second valve rod is fixedly connected to an upper part of the second guide block through a second screw, a first guide rod is fixedly connected to a lower part of the first guide block through a third screw, the first guide rod extends outwardly from a bottom of the first valve seat to an outside of the first valve seat, the first valve seat is provided with a through hole matching the first guide rod, a second guide rod is fixedly connected to a lower part of the second guide block through a fourth screw, the second guide rod extends outwardly from a bottom of the second valve seat to an outside of the second valve seat, and the second valve seat is provided with a through hole matching the second guide rod.

10. The series-connection type servo valve mechanism of claim 1, wherein the first valve seat is fixedly connected to the first valve core seat through a fifth clamp, the second valve seat is fixedly connected to the second valve core seat through a sixth clamp, a sealing ring is disposed between the first valve seat and the first valve core seat, a sealing ring is disposed between the second valve seat and the second valve core seat, the first valve seat is fixedly connected to the second valve seat through a seventh clamp, a first valve seat chamber is provided inside the first valve seat, the first guide block is mounted in the first valve seat chamber, a second valve seat chamber is provided inside the second valve seat, and the second guide block, is mounted in the second valve seat chamber.

* * * * *